United States Patent [19]

Walton et al.

[11] Patent Number: 5,129,633
[45] Date of Patent: Jul. 14, 1992

[54] HYDRAULIC ACTUATOR FOR PARALLEL AUXILIARY LEAF SPRINGS

[75] Inventors: Erlen B. Walton, Farmington Hills; David M. Preston, Drayton Plains; James L. Oliver, Pontiac; James A. Juriga, Bloomfield Hills, all of Mich.

[73] Assignee: Eaton Corporation, Cleveland, Ohio

[21] Appl. No.: 700,343

[22] Filed: May 7, 1991

Related U.S. Application Data

[63] Continuation of Ser. No. 457,068, Dec. 26, 1989, abandoned.

[51] Int. Cl.$^5$ .................... B60G 11/02; B60G 11/10
[52] U.S. Cl. .................... 267/45; 267/265; 280/718
[58] Field of Search .................... 267/45, 48, 52, 158, 267/265, 271, 260; 280/718

[56] References Cited

U.S. PATENT DOCUMENTS

| 1,362,037 | 12/1920 | Peterson | 267/45 |
|---|---|---|---|
| 2,079,314 | 5/1937 | Collier | 267/45 X |
| 2,580,975 | 1/1952 | Tea | 262/45 |
| 2,632,639 | 3/1953 | Proske | 267/28 |
| 2,714,003 | 7/1955 | Focht | 267/45 |
| 2,825,578 | 3/1958 | Walker | |
| 2,826,407 | 3/1958 | Scheublein, Jr. et al. | 267/45 |
| 3,197,231 | 7/1965 | Holzman | 280/DIG. 1 X |
| 3,288,456 | 11/1966 | Paiolelli et al. | 267/45 |
| 3,484,091 | 12/1969 | Draves | 267/54 |
| 3,869,140 | 3/1975 | Allison | |
| 4,433,833 | 2/1984 | Tabe et al. | 267/48 X |
| 4,456,232 | 6/1984 | Shinbori et al. | 267/260 X |

FOREIGN PATENT DOCUMENTS

| 527577 | 10/1921 | France | 267/41 |
|---|---|---|---|
| 1515 | 1/1986 | Japan | 267/48 |
| 2932 | 1/1986 | Japan | 267/48 |
| 113508 | 5/1986 | Japan | 267/48 |
| 935284 | 8/1963 | United Kingdom | 280/124 R |

*Primary Examiner*—George E. A. Halvosa
*Attorney, Agent, or Firm*—P. S. Rulon

[57] ABSTRACT

Selectively engagable auxiliary leaf springs (38 or 138) for vertically supporting a vehicle chassis (32) on an axle assembly (22 or 102) in parallel with main suspension springs (34 or 114). In three of the disclosed embodiments, both ends (38b, 38a) of the auxiliary springs (38) are pivotally attached. In two other embodiments, one end (138a) of the auxiliary leaf springs (142) is pivotally attached and the other end (138b) is rigidly affixed in cantilever fashion. Actuators (56, 139 or 159) are employed to selectively enable or increase load supporting of the auxiliary leaf springs.

8 Claims, 3 Drawing Sheets

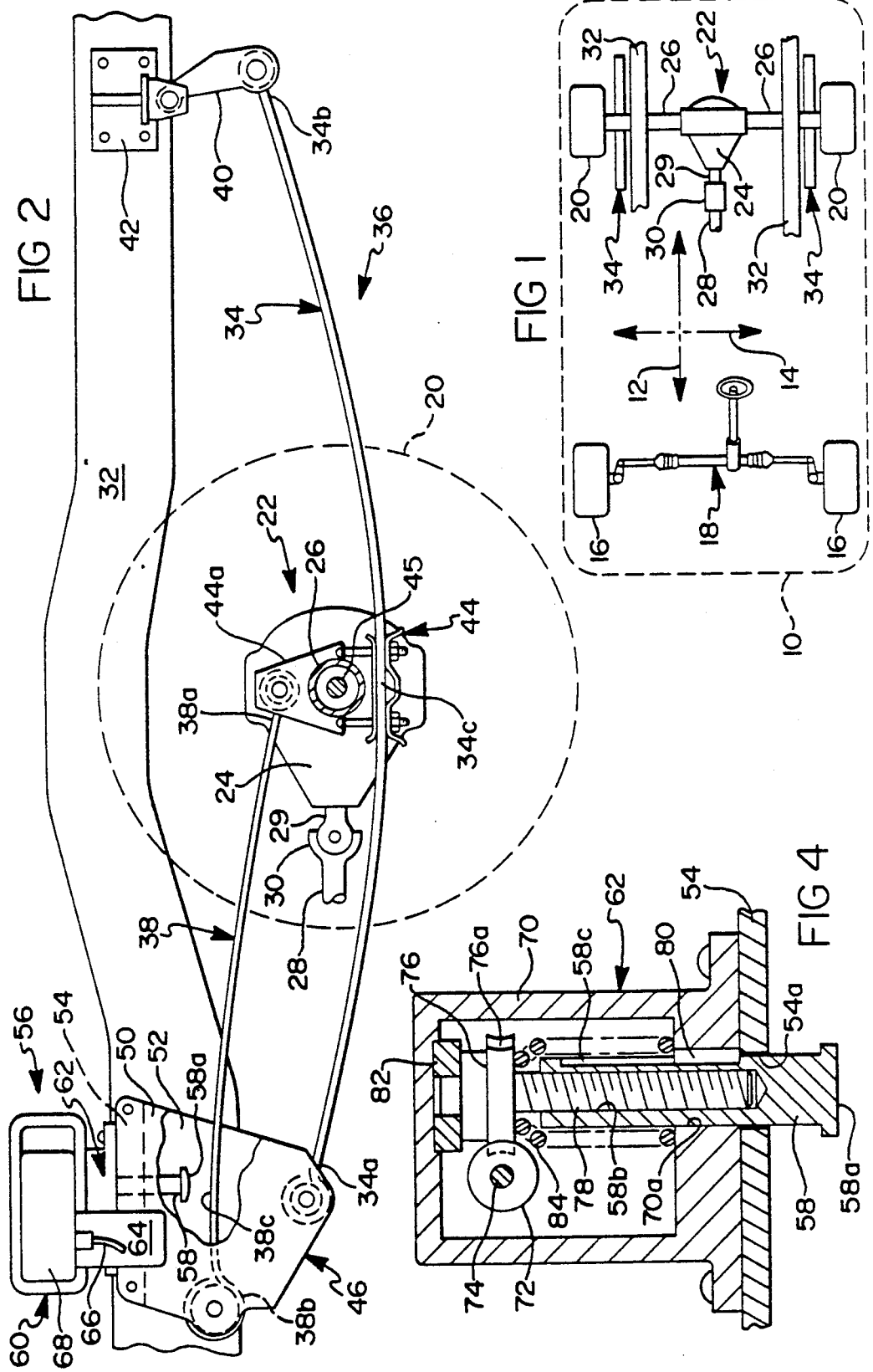

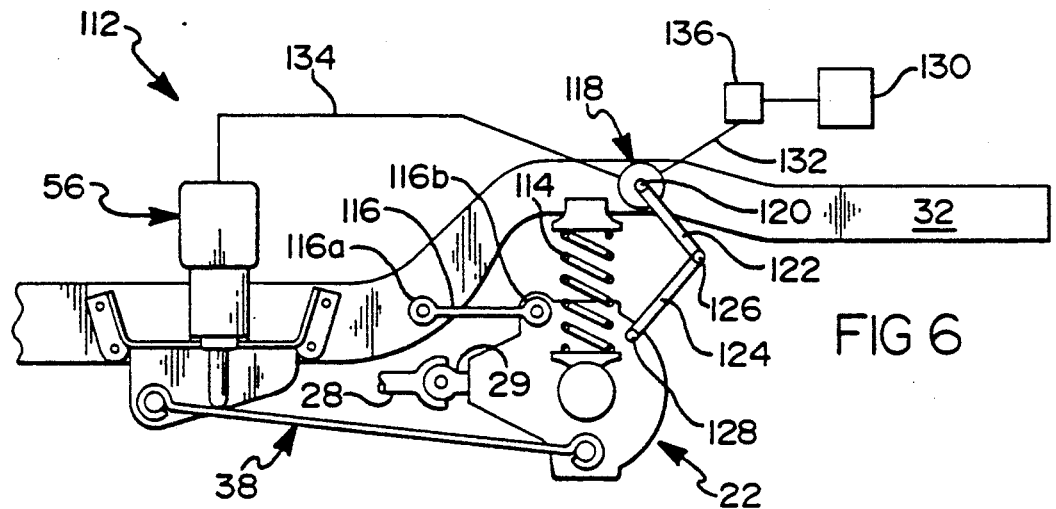
FIG 6
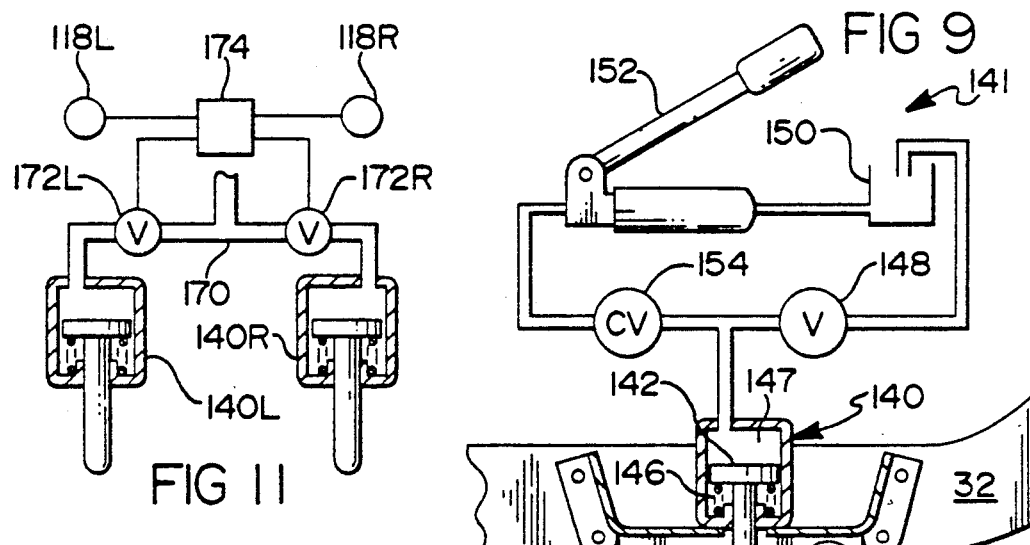
FIG 9
FIG 11
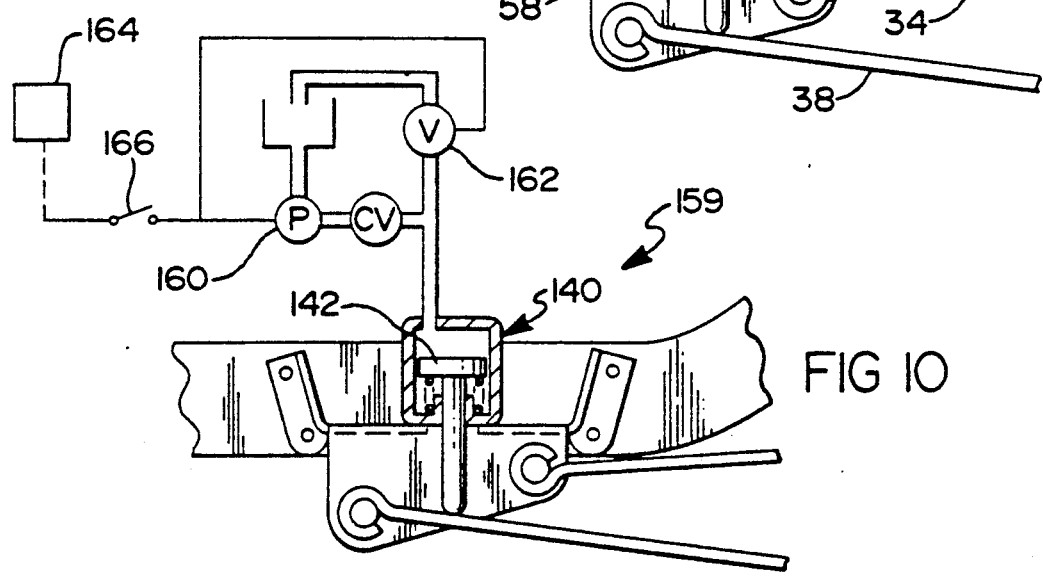
FIG 10

HYDRAULIC ACTUATOR FOR PARALLEL AUXILIARY LEAF SPRINGS

CROSS-REFERENCE TO RELATED APPLICATION

This is a continuation of application Ser. No. 457,068, filed on Dec. 26, 1989, now abandoned.

This application is related to U.S. application Ser. Nos. 456,914, 457,069, both abandoned, and U.S. Pat. Nos. 4,982,972, 5,024,463, 5,029,893 and 5,035,408, all filed on the same date as this application, all assigned to the assignee of this application; and all incorporated herein by reference.

FIELD OF THE INVENTION

This invention relates to auxiliary or helper springs for vehicle suspension systems. More particularly, this invention relates to selectively engagable auxiliary leaf springs.

BACKGROUND OF THE INVENTION

Selectively engagable auxiliary leaf springs are known in the prior art as may be seen by reference to U.S. Pat. No. 3,484,091 to Draves, and incorporated herein by reference. The Draves patent discloses left and right ground engaging wheels rotatably mounted on opposite ends of an axle assembly extending transverse to a longitudinal axis of a vehicle chassis, left and right main suspension springs of the leaf or coil type vertically supporting the chassis on the axle assembly, left and right generally longitudinally extending auxiliary leaf springs each having an end pivotally affixed to the chassis and a unaffixed or free end, and an actuator assembly selectively operative to move the free end into load supporting engagement with the axle assembly. Such an auxiliary spring arrangement allows the main suspension springs to be designed for ride comfort when the vehicle is unloaded or lightly loaded, and is particularly well suited for light duty utility vehicles such as pick-up trucks which are used more for commuting than load hauling. However, since the auxiliary leaf springs of Draves have an unattached or free end they can only function to help support load, also the free ends of the auxiliary springs can clash against the axle and produce annoying noise.

SUMMARY OF THE INVENTION

An object of the present invention is to provide an improved auxiliary leaf spring arrangement for a vehicle.

A further object of the present invention is to provide an auxiliary leaf spring which can function as traction link, which can mitigate distortion of main leaf springs due to drive and/or braking torque, and which, when used with a drive axle having an unsprung differential, can readily control the drive angle between the vehicle drive shaft and the differential pinion shaft.

According to a feature of the invention, a vehicle comprises left and right ground engaging wheel mechanisms rotatably mounted on opposite ends of an axle assembly extending transverse to a longitudinal axis of a vehicle chassis assembly; main suspension springs vertically supporting the chassis on the axle assembly; first and second transversely spaced apart and generally longitudinally extending auxiliary leaf springs each having a first end attached to one of the assemblies and a second end disposed for reacting against the other assembly, the auxiliary leaf spring for vertically supporting the chassis on the axle assembly in parallel with the main spring means; and an actuator means affixed to one of the assemblies and selectively operative to position a reaction means between the one assembly and a portion intermediate the ends of each auxiliary leaf spring for varying the amount of vertical support provided by each auxiliary leaf spring.

The invention is characterized by each reaction means being movably interposed between the auxiliary leaf spring portion and one end of a movable piston disposed in a housing affixed to one of the assemblies the other end of the piston and the housing defining a fluid chamber selectively pressurized by a fluid to inhibit movement of the auxiliary leaf spring portions relative to the one assembly and selectively depressurized to allow such movement.

BRIEF DESCRIPTION OF THE DRAWINGS

A vehicle suspension system employing the auxiliary leaf springs according to the invention is shown in the accompanying drawings in which:

FIG. 1 is a schematic plan view of a vehicle;

FIG. 2 is a side elevational view of the left rear portion of a suspension system having an auxiliary leaf spring pivotally attached at both ends;

FIG. 4 is an elevational-sectional view of an actuator speed reducer for engaging and disengaging the auxiliary leaf spring of FIGS. 2 and 3;

FIGS. 5 and 6 illustrate the auxiliary leaf spring employed with somewhat different suspension systems;

FIGS. 9-11 illustrate alternative control systems of engaging and disengaging the auxiliary leaf springs in each of the disclosed embodiments.

DETAILED DESCRIPTION OF THE DRAWINGS

Figure 3:
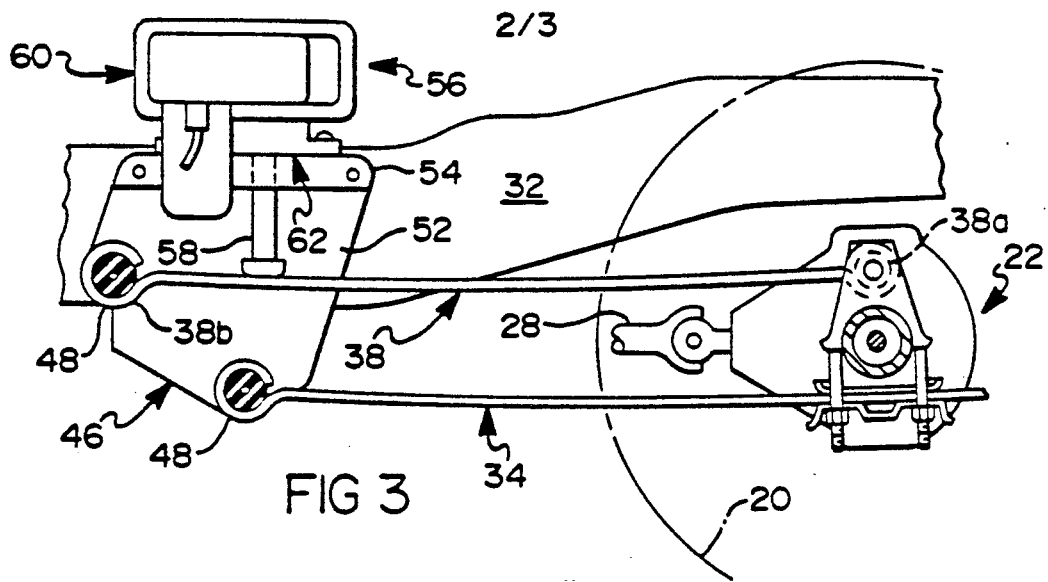
FIG. 3 is a partial view of FIG. 2 with a spring attachment plate removed to illustrate forward mounting of the main and auxiliary leaf spring ends.

The schematic plan view of FIG. 1 illustrates a wheeled vehicle having a body represented by phantom line 10, longitudinal and transverse axes 12,14, left and right front wheels 16, a steering assembly 18, for the front wheels, left and right rear wheels 20 rotatably supported on opposite ends of a rigid and transversely extending drive axle assembly 22, having a differential gear assembly disposed in a differential housing 24 rigidly affixed to transversely extending tube portions 26, an engine driven drive shaft 28 connected to the differential gear assembly pinion shaft 29 by a flexible joint such as a universal joint 30 shown in FIG. 2, partially shown chassis rails 32, and first and second longitudinally extending main leaf springs 34 each having opposite ends 34a,34b in load supporting relation (see FIG. 2) with the chassis rails and each having an intermediate portion 34c affixed to the axle assembly. For purposes of the present invention, the axle assembly 2 may be a rigid drive or non-drive axle, may support the chassis on other than leaf springs 32 (e.g., coil springs), may be other than rigid (e.g., an axle assembly for independent wheel suspension), or may be other than a rear axle.

Looking now at FIGS. 2 and 3, therein is shown a suspension embodiment 36 of the present invention for the left side of axle assembly 22. The right side is the same and is not shown for brevity. Embodiment 36 includes a known, underslung main leaf spring suspension modified to include an auxiliary or helper leaf spring 38 which is selectively engagable to vertically support the vehicle chassis in parallel with main leaf spring 34, which functions as a traction or drag link, which mitigates distortion of main leaf spring due to drive and braking torque, and which readily controls angular changes in the drive angle between drive and pinion shafts 28,29 due to distortion of main leaf spring 34 and variations in the relative vertical positions of the chassis and axle assembly.

The rear end 34b of spring 34 is pivotally attached to chassis rail 32 in known manner by a shackle and bracket 40,42. A bracket assembly 44 rigidly affixes intermediate portion 34c to the underside of axle tube 26 at a position radially spaced from the rotational and transversely extending axis of a stub shaft 45 drivingly interconnecting wheel 20 and the differential. Bracket assembly 44 includes a pair of upwardly extending and transversely spaced apart flanges 44a (only one shown) for pivotally affixing an end 38a of auxiliary leaf spring 38 to the axle assembly at a position diametrically opposite spring portion 34c. The front or forward ends 34a and 38b of the main and auxiliary leaf springs are pivotally attached to a bracket assembly 46 rigidly affixed to chassis rail 32. The pivotal attachments of the main and auxiliary spring ends may include elastomeric bushings 48 in known manner as shown in FIG. 3.

Bracket assembly 46 includes transversely spaced apart side plates 50,52 and an upper plate 54 rigidly affixed to and spacing the side plates apart. Side plate 50 is partially broken away in FIG. 2 to show side plate 52 and is cut away in FIG. 3. Upper bracket plate 54 provides a mounting surface for an actuator assembly 56 selectively operative to move a surface 58a of a reaction member 58 into and out of engagement with an upper surface portion 38c of auxiliary leaf spring 38. When surfaces 58a,38c are spaced apart, as shown in FIG. 2, auxiliary leaf spring end 38b is free to pivot and main leaf spring 38 provides sole load support for the chassis. When the surfaces are engaged, as shown in FIG. 3, pivotal movement of end 38b is prevented or inhibited and the auxiliary spring shares load support of the chassis in parallel with main leaf spring 34.

Since auxiliary leaf spring 38 is pivotally affixed at its ends 38b,38a to the chassis and the axle assembly and since the auxiliary spring between ends 38b,38a is generally in spaced parallel relation to the portion of main leaf spring 34 between end 34a and intermediate portion 34c, it also functions as a drag or traction link which mitigates distortion of main leaf spring 34 due to drive and/or braking torque and which readily controls angular changes in drive angle between drive and pinion shafts 28,29 due to main leaf spring distortion and variation in the relative vertical positions of the chassis and axle assembly. Such drive angle changes are readily controlled by varying the length of the auxiliary leaf, e.g., shortening auxiliary leaf spring 38 in embodiment 36 will provide a nose down attitude of pinion shaft 29 as the vertical distance between chassis and axle assembly decreases due to increased load on the chassis or jounce of the axle assembly. Main leaf spring 34 may be of the single or multiple leaf type. Since auxiliary leaf spring 38 is attached at both ends, it also is effective to maintain the axle assembly in position should the main leaf spring break.

Actuator assembly 56 includes first and second speed reducer assemblies 60,62 drivingly connected in series. Assembly 60 includes an electric motor 64 connectable to a source of electrical power by a wire 66, and an unshown speed reducer contained in a housing 68 and driven by the motor. Assembly 62, which is shown in vertical section in FIG. 4, includes a housing 70 rigidly affixed to upper plate 54, a worm 72 mounted for rotation in the housing about the axis of a shaft 74 driven by motor 64. The worm includes unshown teeth in mesh with partially shown teeth 76a of a worm gear 76 which is affixed to a screw 78 threadably received in a bore 58b of reaction member 58. Reaction member 58 slidably extends through a bore 70a in housing 70 and through an opening 54a in upper plate 54. A seal or boot may be provided to exclude ingress of foreign matter along the interface of member 58 and bore 70a. Rotation of the reaction member is prevented by an elongated keyway 58c slidably received by a key 80 affixed to housing 70. The threaded relation between screw 78 and bore 58b provide a mechanism for linearly moving the reaction member into engagement with auxiliary spring portion 38c in response to rotation of gears 72,76. Upward thrust acting on reaction member 58, screw 78 and worm gear 76 is reacted by housing 62 through a thrust bearing 82, and these components are biased upward by a spring 84. Actuator assembly 56 may be any of several well known speed reducer assemblies capable of engaging reaction member 58 and sized for engaging the reaction member only prior to chassis loading requiring the auxiliary springs or capable (as herein) of engaging and varying the position of the reaction member under load. Assembly 60 is obtainable through the Eaton Corporation Truck Components Division in Galesburg, Mich., U.S.A. under part number 113700.

Figure 5:
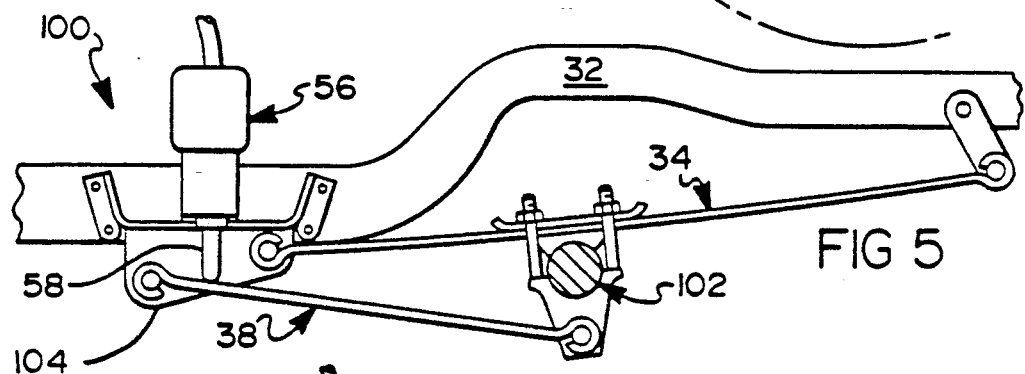

FIGS. 5 and 6 schematically illustrate alternative embodiments of main suspension springs in combination with the auxiliary leaf springs of the present invention. In these embodiments like components will be identified by like reference numbers.

In the suspension embodiment 100 of FIG. 5 auxiliary leaf spring 38 is employed with an over slung main leaf spring 34 attached to the top of an axle assembly 102 which may be a rigid non-drive axle, as shown, or drive axle as in FIGS. 2 and 3. Actuator assembly 56 though different in outer appearance is basically the same as in FIGS. 2-4.

FIG. 6 schematically illustrates a suspension embodiment 112 wherein auxiliary leaf spring 38 and actuator assembly 56 are employed with a main suspension spring 114 of the coil type supporting the chassis on an axle assembly which may be of the drive or non-drive type. The embodiment of FIG. 6 includes a wishbone type link 116 pivotally attached at forward ends 116a to the chassis rails and at the rear end 116b to the axle assembly. Link 116 and auxiliary leaf spring 38 react against drive and braking torque and control the angular relation of drive and pinion shafts 28,29 in the same sense as the main and auxiliary leaf springs in FIGS. 2 and 3. Accordingly, the relative lengths of spring 38 and link 116 may be varied to provide different angular relations. Actuator assembly 56, as well as the actuator assemblies in FIGS. 2, 5, 7, 8 and 10, may be controlled by a position means or rotary switch 118 having a housing affixed to the chassis and a rotatable shaft 120 connected to the axle assembly by links 122,124 pivotally connected together at 126, pivotally connected to the axle assembly at 128, and fixed to shaft 120. The angular position of shaft 120 represents the relative vertical relation of the chassis and axle assembly. Rotation of the shaft opens and closes switches to connect a source of electrical power 130 to the actuator assembly via wires 132,134. The actuator may be deactivated by a relay switch 136 which opens under certain conditions, e.g., when the vehicle is in motion. In some installations a position switch may be provided on each side of the vehicles, as explained further hereinafter.

Figure 7:
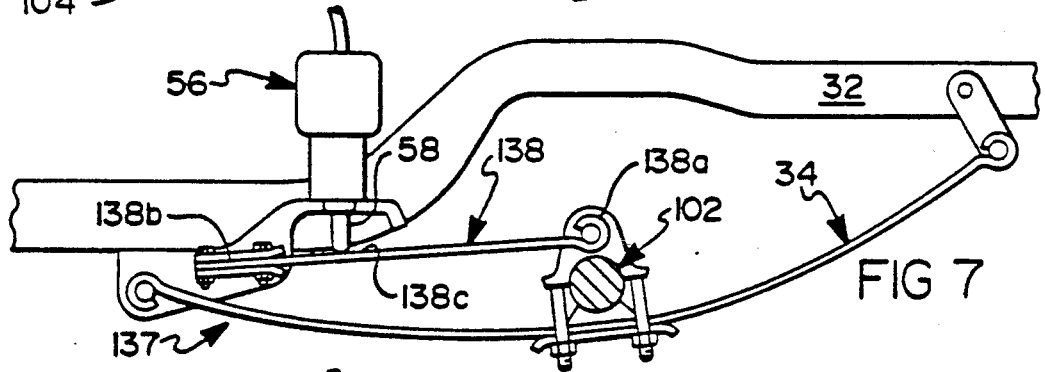
FIGS. 7 and 8 illustrate auxiliary leaf springs having one end affixed in cantilever fashion and the other end pivotally attached.
Figure 8:
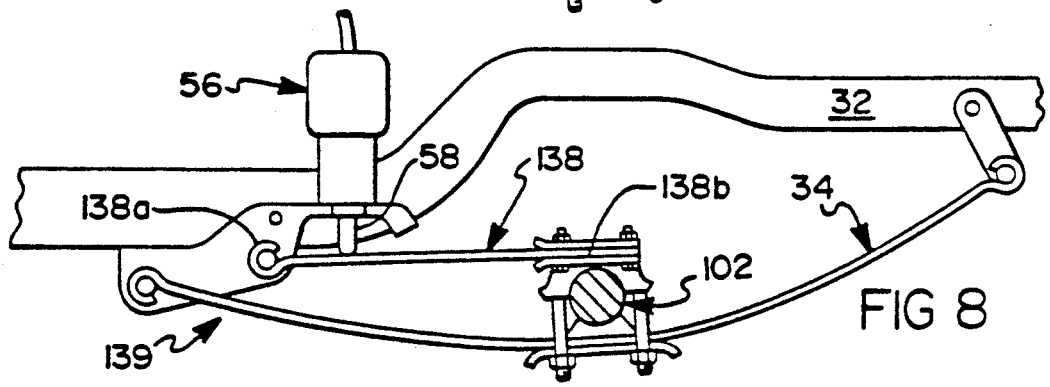

FIGS. 7 and 8 schematically illustrate alternative embodiments of the auxiliary leaf springs in combination with main suspension springs. The main suspension springs may be of the over or under slung leaf spring type 34 as respectively illustrated in FIG. 2 and 5, or they may be of the coil spring type illustrated in FIG. 6. In both embodiments of FIGS. 7 and 8, the auxiliary leaf springs are attached at both ends as in the previous description embodiments. In embodiment 137 of FIG. 7, the auxiliary leaf spring 138 has an end 138a pivotally attached to the axle assembly 102, as previously described, and an end 138b which is rigidly affixed to chassis in cantilever fashion. Accordingly, auxiliary leaf spring 138 is continuously operative to vertically support the vehicle chassis in parallel with the main suspension spring. The combined spring rate of the main suspension springs and auxiliary spring 138 may be selected for ride comfort when the vehicle is unloaded or lightly loaded. When the vehicle load is increased, actuator 56 may move reaction member 58 into contact with a portion 138c of spring 138, thereby shortening the active flex length of spring 138 to increase its effective spring rate and the percentage of load supported thereby.

In embodiment 139 of FIG. 8, the auxiliary leaf spring 138 has end 138a pivotally attached to the chassis and end 138b rigidly affixed to the axle assembly in cantilever fashion. This reversed attachment arrangement of the ends for a given spring rate of the auxiliary spring causes the auxiliary spring to be somewhat less effective until actuator 58 moves reaction member 58 into contact with the auxiliary leaf spring portion 138c.

FIG. 9 schematically illustrates a hydraulic control 141 including a hydraulic cylinder 140 having a slidable piston 142 therein affixed at one end to the reaction member 58. The piston is preferably biased upward by a spring 146. The other end of the piston and the cylinder define a fluid chamber 147 selectively pressurized by hydraulic fluid in response to closing of a manually operated valve 148 connected to a reservoir 150 and by manual operation of a hand operated pump 152 which transmits pressurized fluid to the cylinder via a check valve 154.

FIG. 10 illustrates a hydraulic control 159 similar to the hydraulic control of FIG. 9 but employing an electrically powered pump and valve 160,162 in lieu of the manual pump and valve in FIG. 7. A source of electrical power 164 is provided to the pump and valve by a manually operated switch 166. Alternatively, switch 166 may be replaced by the rotary and relay switches 118,136 of FIG. 6.

The hydraulic control systems may be provided for each auxiliary leaf spring or either of the systems of FIGS. 9 and 10 may be interconnected as show in FIG. 11, therein left and right side hydraulic cylinders 140L,140R are tied together by a branch conduit 170 having a left and right height control valves 172L,172R interposed therein and operated by a control circuit 174 which compares signals from left to right position switches 118L,118R for effecting level operation of the vehicle chassis.

Several embodiments of the invention have been disclosed for illustration purposes. Many variations of the disclosed embodiments are believed to be within the spirit of the invention. The following claims are intended to cover inventive portions of the disclosed embodiments and modifications thereof which are believed to be within the spirit of the invention.

What is claimed is:

1. A vehicle comprising left and right ground engaging wheel mechanisms rotatably mounted on opposite ends of an axle assembly extending transverse to a longitudinal axis of a vehicle chassis assembly having front and rear end; main spring means vertically supporting the chassis assembly on the axle assembly, the main spring means include first and second transversely spaced apart and generally longitudinally extending main leaf springs each having opposite ends in load supporting relation with the chassis and each having an intermediate portion affixed to the axle assembly, means attaching one of said opposite ends of each main spring means to the chassis for free pivotal and non-linear movement relative to the chassis; first and second transversely spaced apart and generally longitudinally extending auxiliary leaf springs each having a first and a second end respectively attached to the chassis and axle assemblies, the auxiliary leaf springs for vertically supporting the chassis on the axle assembly in parallel with the main spring means; and an actuator means affixed to one of the assemblies and selectively operative to position a reaction means between the one assembly and a portion intermediate the ends of each auxiliary leaf spring for varying the amount of vertical support provided by the auxiliary leaf springs; characterized by:

the auxiliary leaf springs each being of the single leaf type and operative to function as a traction link independent of the position of the reaction means;

first bracket means rigidly affixed to the chassis assembly for attaching the first end of each auxiliary spring for free pivotal movement and non-linear movement relative to the chassis;

second bracket means rigidly affixed to the axle assembly and including means for attaching the second ends of the auxiliary leaf springs and rigidly attaching the intermediate portions of the main leaf springs to opposite sides of the axle assembly relative to the vertical, said means for attaching the second ends allowing free pivotal movement and preventing linear movement of the second ends relative to the axle assembly; and each reaction means being movably interposed between the auxiliary leaf spring portion and one end of a movable piston disposed in a housing affixed to one of the assemblies, the other end of the piston and the housing defining a fluid chamber selectively pressurized by a fluid to inhibit movement of the auxiliary leaf spring portions relative to the one assembly and selectively depressurized to allow such movement.

2. The vehicle of claim 1, wherein the fluid is a liquid.

3. The vehicle of claim 1, wherein the fluid chamber is selectively pressurized and depressurized by a hydraulic system including a valve and a pump, the valve having a first position for preventing fluid pressurization of the chamber and a second position allowing fluid pressurization of the chamber by the pump.

4. The vehicle of claim 3, wherein the fluid chambers defined by the pistons and housings associated with the first and second auxiliary springs are connected to the pump and valve via a branch conduit having first and second height control valves each disposed for control of fluid flow in the branch conduit to one of the fluid chambers in response to signals from first and second position sensors respectively operative to sense the relative vertical relation between the chassis and axle assembly on each side of the vehicle.

5. The vehicle of claim 3, wherein the pump is actuated by an electric motor connected to a source of electric power by switch means.

6. The vehicle of claim 5, wherein the switching means includes a position sensor for sensing the relative vertical relation of the chassis and axle assemblies and operative to activate the pump in response to the relative vertical position being less than a predetermined amount.

7. The vehicle of claim 3, wherein the pump is manually actuated.

8. The vehicle of claim 1, wherein, the fluid chamber is selectively pressurized and depressurized by a system including a valve and a pump, the valve having an open position for preventing fluid pressurization of the chamber and a closed position allowing fluid pressurization of the chamber by the pump in response to actuation of the pump at a position remote from the reaction means.

* * * * *